United States Patent [19]

Engdahl et al.

[11] Patent Number: 4,936,114
[45] Date of Patent: Jun. 26, 1990

[54] APPARATUS AND METHOD OF FREEZE CONCENTRATING AQUEOUS WASTE AND PROCESS STREAMS TO SEPARATE WATER FROM PRECIPITABLE SALTS

[75] Inventors: Gerald E. Engdahl, Wheaton; James H. Richardson, Aurora; William S. Schoerner, Plainfield; Matloob Husain, Wheaton, all of Ill.

[73] Assignee: Chicago Bridge & Iron Technical Services Company, Oak Brook, Ill.

[21] Appl. No.: 370,876

[22] Filed: Jun. 23, 1989

[51] Int. Cl.$^5$ .............................................. B01D 9/04
[52] U.S. Cl. ........................................ 62/532; 62/123
[58] Field of Search ......................... 62/123, 532, 541

[56] References Cited

U.S. PATENT DOCUMENTS

| | | | |
|---|---|---|---|
| 3,070,969 | 1/1963 | Ashley et al. | 62/58 |
| 3,477,241 | 11/1969 | Ashley | 62/124 |
| 3,501,924 | 3/1970 | Ashley | 62/123 |
| 3,620,034 | 11/1971 | Ganiaris | 62/58 |
| 3,664,145 | 5/1972 | Johnson | 62/58 |
| 3,992,900 | 11/1976 | Campbell | 62/541 |
| 4,091,635 | 5/1978 | Ogman | 62/123 |
| 4,314,455 | 2/1982 | Engdahl | 62/124 |
| 4,509,344 | 4/1985 | Ludwigsen et al. | 62/123 |
| 4,557,741 | 12/1985 | VanPelt | 62/541 |
| 4,705,624 | 11/1987 | Thijssen | 62/532 |
| 4,750,333 | 6/1988 | Husain et al. | 62/118 |
| 4,762,622 | 8/1988 | Thijssen | 62/532 |

Primary Examiner—Ronald C. Capossela
Attorney, Agent, or Firm—Marshall, O'Toole, Gerstein, Murray & Bicknell

[57] ABSTRACT

A method and apparatus for cooling a warm feed stream of aqueous liquid to close to but above the freezing point of the aqueous liquid and delivering it to a mixing tank; withdrawing an aqueous ice slurry from an ice slurry receiver-crystallizer and delivering it to the mixing tank to further cool the contents and produce temperature control of the mixing tank contents; withdrawing an aqueous slurry from the mixing tank and delivering it to a slurry thickener tank for precipitate separation thereof; removing the precipitate from the slurry thickener tank and disposing of it; withdrawing aqueous liquid from the thickener tank and delivering it to the ice slurry receiver-crystallizer; and withdrawing an aqueous ice slurry from the ice slurry receiver-crystallizer, feeding it through a freeze exchanger to produce additional aqueous ice slurry and withdrawing the aqueous ice slurry from the freeze exchanger and feeding it to the ice slurry receiver-crystallizer. A single feed tank can be used in place of the mixing tank and the thickener tank.

31 Claims, 2 Drawing Sheets

APPARATUS AND METHOD OF FREEZE CONCENTRATING AQUEOUS WASTE AND PROCESS STREAMS TO SEPARATE WATER FROM PRECIPITABLE SALTS

This invention relates to apparatus for, and methods of, separating contaminants from aqueous mixtures. More particularly, this invention is concerned with concentrating aqueous waste or process streams by freeze concentration and then separating water from the stream.

BACKGROUND OF THE INVENTION

Various freeze processes have been developed to separate water from brackish water as well as aqueous waste streams containing dissolved or suspended salts. See, for example, the U.S. Pat. Nos. of Ashley et al 3,070,969; Ashley 3,477,241; Ashley 3,501,924; Ganiaris 3,620,034; Johnson 3,664,145 and Ogman 4,091,635.

More recent freeze processes employ a vertical shell and tube freeze exchanger in which an ice slurry is formed. The ice slurry is discharged from the bottom of the freeze exchanger into an ice slurry receiver-crystallizer. The ice slurry is subsequently sent to an ice separator-washer. Such apparatus is disclosed in the U.S. Pat. Nos. of Engdahl 4,314,455 and Husain et al 4,750,333.

The described apparatus is suitable for freeze concentrating waste water streams having a relatively low concentration of precipitable salts. It is inherent in the freeze concentration process that as the amount of ice formed increases that the concentration of salts in the water increases, thereby causing them to precipitate. Even though such precipitates carry over with the ice to the washer-separator they can be handled satisfactorily up to a reasonable amount. However, highly concentrated waste water, i.e. waste water that contains a considerable fraction of precipitable salt, is not readily processed in such apparatus because the precipitable salts carry over into the ice separating, washing and melting stage. This adversely affects the product water quality because the precipitable salts that are carried over with the ice into the washing stage and into the melter re-dissolve into the product water, increasing the salt content of the product water. It is crucial to obtaining product water of acceptable purity for discharge to the environment that the precipitable salts be separated.

SUMMARY OF THE INVENTION

According to one aspect of the invention apparatus is provided comprising a heat exchanger; a feed stream conduit for feeding a warm stream of aqueous liquid through the heat exchanger; means to pass a cold refrigerant fluid through the heat exchanger to cool the aqueous liquid feed stream therein; a mixing tank; conduit means for feeding cold aqueous liquid feed from the heat exchanger to the mixing tank; an ice slurry receiver-crystallizer; conduit means for feeding an aqueous ice slurry from the ice slurry receiver-crystallizer to the mixing tank; a slurry thickener tank; conduit means for feeding a cold aqueous liquid and precipitate salts from the mixing tank to the thickener tank; conduit means for removing reject liquid and precipitate salts from the thickener tank; conduit means for withdrawing aqueous liquid from the thickener tank and delivering it to the ice slurry receiver-crystallizer; a freeze exchanger for producing aqueous ice slurry, the freezer having an aqueous ice slurry inlet and an aqueous ice slurry outlet; conduit means for withdrawing aqueous ice slurry from the ice slurry receiver-crystallizer and delivering it to the freeze exchanger inlet; means for feeding aqueous ice slurry from the freeze exchanger outlet to the ice slurry receiver-crystallizer; and conduit means for removing ice slurry from the ice slurry receiver-crystallizer for delivering it to a separator for separating the slurry ice content from the aqueous liquid.

The ice slurry receiver-crystallizer can include conduit means for delivering the aqueous liquid content of an ice slurry thereto after the ice content is separated.

Conduit means can communicate with the thickener tank for removing low specific gravity fluid therefrom, and especially gases. This conduit means can contain a suitable control valve.

A control valve can be positioned either in the feed stream conduit for feeding a warm stream of contaminated aqueous liquid to the heat exchanger or in the conduit between the heat exchanger and the mixing tank. The valve can be responsive to the temperature of the ice slurry in the receiver-crystallizer.

A control valve can be positioned in the conduit means for feeding the aqueous ice slurry from the ice slurry receiver-crystallizer to the mixing tank. The control valve can be responsive to the temperature of the aqueous liquid in the mixing tank.

Instead of using both a mixing tank and a thickener tank it is also feasible to use a single feed tank in place of the two individual tanks. Conduit means, which can contain an optional control valve, can then feed cold aqueous liquid feed from the heat exchanger to the feed tank; conduit means can feed aqueous ice slurry from the ice slurry receiver-crystallizer to the feed tank; and conduit means can withdraw aqueous liquid from the feed tank and deliver it to the ice slurry receiver-crystallizer.

Conduit means can also be included for removing reject liquid and precipitate from the feed tank. Furthermore, conduit means which communicates with the feed tank can be included for removing low specific gravity fluid therefrom.

According to a second aspect of the invention a method is provided comprising cooling a warm feed stream of contaminated aqueous liquid to close to but above the freezing point of the aqueous liquid and delivering it to a mixing tank; withdrawing an aqueous ice slurry from an ice slurry receiver-crystallizer and delivering it to the mixing tank to further control the contents and produce temperature control of the mixing tank contents; withdrawing a slurry of aqueous liquid and precipitate from the mixing tank and delivering it to a slurry thickener tank for precipitate growth and separation thereof; removing the precipitate from the slurry thickener tank and disposing of it; withdrawing aqueous liquid from the thickener tank and delivering it to the ice slurry receiver-crystallizer; and withdrawing an aqueous ice slurry from the ice slurry receiver-crystallizer, feeding it through a freeze exchanger to produce additional aqueous ice slurry and withdrawing the aqueous ice slurry from the freeze exchanger and feeding it to the ice slurry receiver-crystallizer.

Also provided by the invention is a method comprising cooling a warm feed stream of aqueous liquid close to but above the freezing point of the aqueous liquid and delivering it to a feed tank; withdrawing an aqueous ice slurry from an ice slurry receiver-crystallizer and delivering it to the feed tank to further cool the contents and product temperature control of the mixing tank contents; removing a precipitate from the feed tank and disposing of it; withdrawing aqueous liquid from the feed tank and delivering it to the ice slurry receiver-crystallizer; and withdrawing an aqueous ice slurry from the ice slurry receiver-crystallizer, feeding it through a freeze exchanger to produce additional aqueous ice slurry and withdrawing the aqueous ice slurry from the freeze exchanger and feeding it to the ice slurry receiver-crystallizer.

DETAILED DESCRIPTION OF THE DRAWINGS

Figure 1:
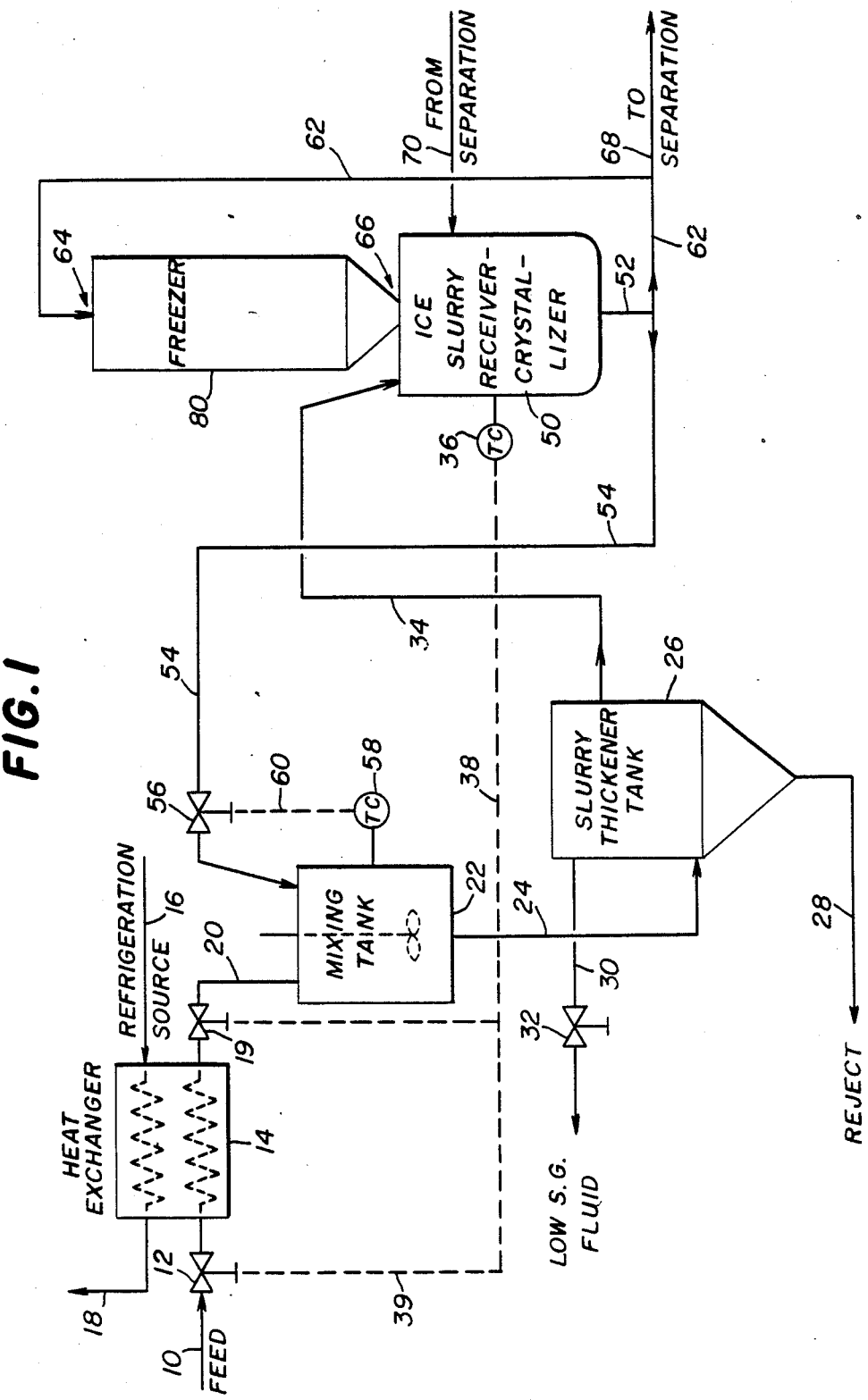
FIG. 1 is a schematic drawing illustrating a first combination of apparatus provided by the invention which uses both a mixing tank and a slurry thickener tank.
Figure 2:
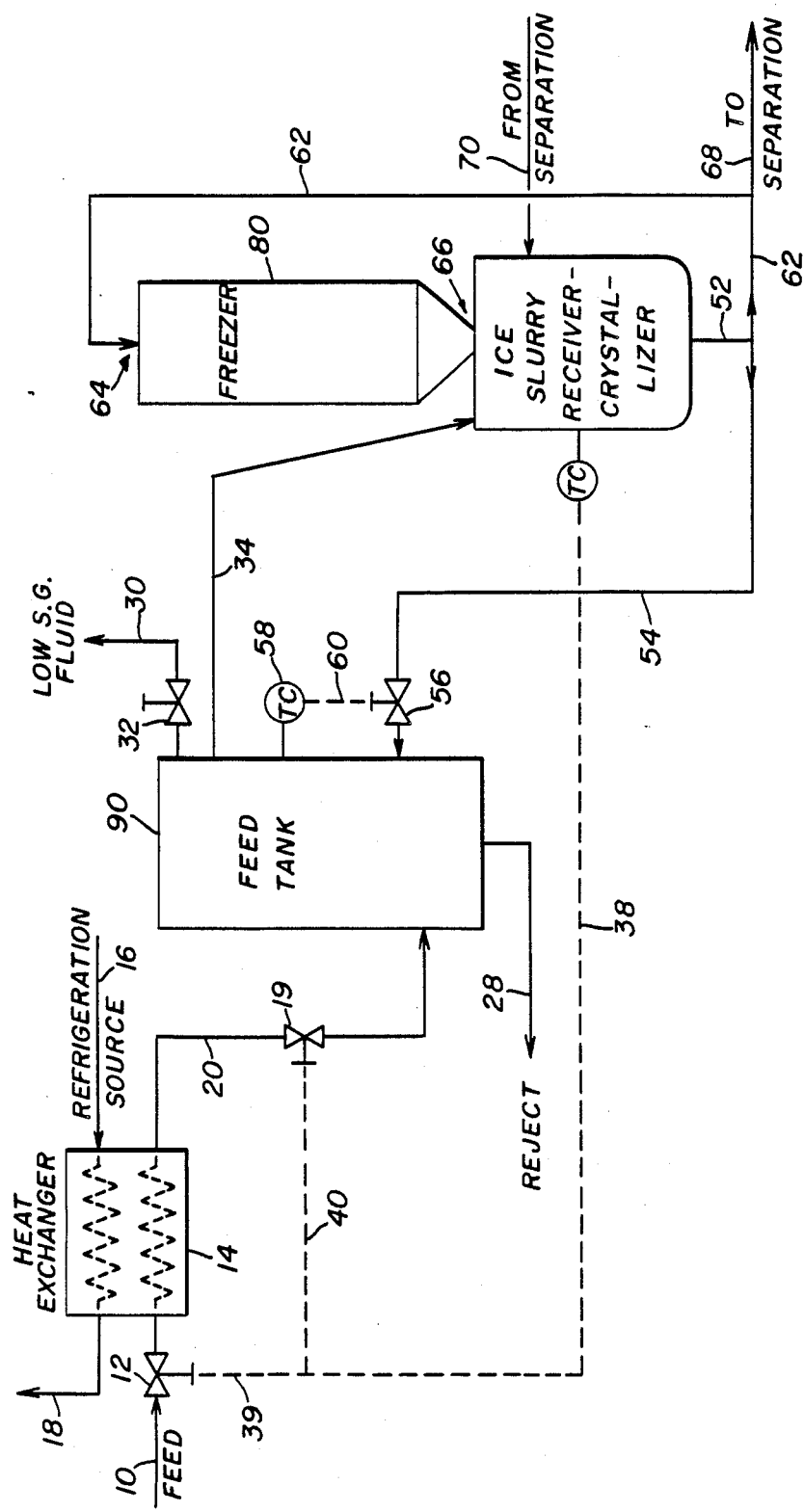
FIG. 2 is a schematic drawing illustrating a second combination of apparatus provided by the invention which uses a feed tank which functions as a combination mixing tank and slurry thickener tank.

To the extent it is reasonable and practical the same or similar elements which appear in FIGS. 1 and 2 will be identified by the same numbers.

With reference to FIG. 1, an aqueous liquid feed stream is fed to conduit 10 which communicates with heat exchanger 14 through control valve 12. A suitable cold refrigerant is fed to conduit 16 which communicates with heat exchanger 14 so that the refrigerant flows through the heat exchanger countercurrent to the flow of the feed stream through the heat exchanger. Warm refrigerant is withdrawn from heat exchanger 14 by conduit 18 and, after being cooled, is recycled to conduit 16.

The aqueous liquid feed is cooled in heat exchanger 14 to a temperature close to, but above, its freezing point as it flows through heat exchanger 14. The cooled aqueous liquid feed flows from heat exchanger 14 into conduit 20 which delivers it to mixing tank 22. Conduit 20 can contain control valve 19.

Aqueous ice slurry is withdrawn from ice slurry receiver-crystallizer 50 through conduit 52 which communicates with conduit 54. The aqueous ice slurry flows through conduit 54, containing control valve 56, into mixing tank 22. Sufficient aqueous ice slurry is fed to mixing tank 22 by conduit 54 to keep the temperature of the liquid therein close to, but above, the freezing point so that there is no increase in ice particle formation. The flow of ice slurry is controlled by valve 56 which is regulated by a temperature control 58 which responds to the temperature of liquid in mixing tank 22. The control 58 sends a signal by wire 60 to valve 56 to thereby control the rate of flow. However, the liquid temperature in mixing tank 22 is maintained low enough to cause dissolved salts to begin to precipitate.

Cold aqueous liquid and precipitate salts are withdrawn from mixing tank 22 through conduit 24 and fed to slurry thickener tank 26 in which the precipitate salts are separated from the liquid.

The precipitated salts are removed with some liquid from slurry thickener tank 26 by conduit 28 and are disposed of in an acceptable manner.

Since the liquid feed may contain one or more low specific gravity fluids, conduit 30 is positioned so as to communicate with the uper interior space of slurry thickener tank 26. The withdrawal of low specific gravity fluids is regulated by control valve 32.

The aqueous liquid having a reduced salt concentration is withdrawn from slurry thickener tank 26 by conduit 34 and is delivered to ice slurry receiver-crystallizer 50. Temperature controller 36 measures the temperature in ice slurry receiver-crystallizer 50 and by signal line 38,39 sends a signal to control valve 12 to regulate the flow of the feed stream through heat exchanger 14, or by signal line 38,40 sends a signal to control valve 19 to regulate the flow of liquid to the mixing tank 22.

Aqueous ice slurry is withdrawn from ice slurry receiver-crystallizer 50 by conduit 52 and is fed to conduit 62 which delivers it to the inlet 64 at the top of shell and tube freeze exchanger 80. As the ice slurry flows downwardly through the tubes it is further cooled by heat exchange with a cold refrigerant on the shell side of the freezer thereby producing additional ice particles. The ice slurry flows from the freeze exchanger outlet 66 into ice slurry receiver-crystallizer 50.

Ice slurry is withdrawn from slurry receiver-crystallizer 50 by conduits 52,62,68 and fed to an ice separator-washer vessel (not shown). The ice content is separated from the liquid content and the liquid content is recycled by conduit 70 to ice slurry receiver-crystallizer 50.

The apparatus illustrated by FIG. 2 is very similar to that shown in FIG. 1, which is the preferred embodiment. The main difference will be seen to be that the apparatus of FIG. 2 uses only a feed tank 90 to perform the combined functions of the mixing tank 22 and the slurry thickener tank 26 used in the apparatus of FIG. 1. The flow of liquid to feed tank 90 is controlled by either valve 12 or valve 19 as previously described herein.

As shown in FIG. 2, the cooled aqueous liquid feed flows from heat exchanger 14 into conduit 20 which delivers it to feed tank 90. Also, ice slurry withdrawn from ice slurry receiver-crystallizer 50 through conduit 52 is fed to conduit 54 which feeds it through control valve 56 to feed tank 90. The aqueous liquid having a reduced salt concentration is withdrawn from feed tank 90 by conduit 34 and is delivered to ice slurry receiver-crystallizer 50.

Each of the described system will be seen to incorporate the following features, all of which contribute to a highly efficient operation:

1. The temperature of the feed stream is regulated by cooling it with an energy efficient refrigeration source and the addition of a small ice slurry stream.
2. Control of the liquid composition in mixing tank 22 and feed tank 90 by manipulation of the ice slurry stream 54.
3. Use of feed tank 90 or slurry thickener tank 26 for precipitate growth and removal and for immiscible light ends removal.

The apparatus and method provided by this invention is useful for precipitating salts from many different highly concentrated waste waters. It is especially useful in treating waste water from the Stretford Process. Such waste water contains up to 10% dissolved solids, most of which is sodium sulfate and sodium thiosulfate. Sodium sulfate quickly precipitates when the waste water is cooled to a temperature 5° F. above the freezing temperature, thereby yielding a saturated aqueous solution which can be fed to a freeze exchanger to form an ice slurry which can be delivered to a separator-washer to separate the ice content.

The foregoing detailed description has been given for clearness of understanding only, and no unnecessary limitations should be understood therefrom, as modifications will be obvious to those skilled in the art.

What is claimed is:

1. Apparatus comprising:
   a heat exchanger;
   a feed stream conduit for feeding a warm stream of aqueous liquid through the heat exchanger;
   means to pass a cold refrigerant fluid through the heat exchanger to cool the aqueous liquid feed stream therein;
   a mixing tank;
   conduit means for feeding cold aqueous liquid feed from the heat exchanger to the mixing tank;
   an ice slurry receiver-crystallizer;
   conduit means for feeding an aqueous ice slurry from the ice slurry receiver-crystallizer to the mixing tank;
   a slurry thickener tank;
   conduit means for feeding a cold aqueous liquid from the mixing tank to the thickener tank;
   conduit means for removing reject liquid and precipitate from the thickener tank;
   conduit means for withdrawing aqueous liquid from the thickener tank and delivering it to the ice slurry receiver-crystallizer;
   a freeze exchanger for producing aqueous ice slurry, the freeze exchanger having an aqueous ice slurry inlet and an aqueous ice slurry outlet;
   conduit means for withdrawing aqueous ice slurry from the ice slurry receiver-crystallizer and delivering it to the freeze exchanger inlet;
   means for feeding aqueous ice slurry from the freeze exchanger outlet to the ice slurry receiver-crystallizer; and
   conduit means for removing ice slurry from the ice slurry receiver-crystallizer for delivering it to a separator for separating the slurry ice content from the liquid content.

2. Apparatus according to claim 1 in which:
   the ice slurry receiver-crystallizer includes conduit means for delivering the liquid content of an ice slurry thereto after the ice content is separated.

3. Apparatus according to claim 2 in which:
   a control valve is positioned in the conduit means for removing low specific gravity fluid from the thickener tank.

4. Apparatus according to claim 1 in which:
   conduit means communicates with the thickener tank for removing low specific gravity fluid therefrom.

5. Apparatus according to claim 1 in which:
   a control valve is positioned in the feed stream conduit for feeding a warm stream of aqueous liquid to the heat exchanger.

6. Apparatus according to claim 1 in which:
   a control valve is positioned in the conduit means leading from the heat exchanger to the mixing tank.

7. Apparatus according to claim 5 or 6 in which:
   the valve is responsive to the temperature of the ice slurry in the receiver-crystallizer.

8. Apparatus according to claim 1 in which:
   a control valve is positioned in the conduit means for feeding an aqueous ice slurry from the ice slurry receiver-crystallizer to the mixing tank.

9. Apparatus according to claim 8 in which:
   the control valve is responsive to the temperature of the aqueous liquid in the mixing tank.

10. Apparatus comprising:
    a heat exchanger;
    a feed stream conduit for feeding a warm stream of aqueous liquid through the heat exchanger;
    means to pass a cold refrigerant fluid through the heat exchanger to cool the aqueous liquid feed stream therein;
    a feed tank;
    conduit means for feeding cold aqueous liquid feed from the heat exchanger to the feed tank;
    an ice slurry receiver-crystallizer;
    conduit means for feeding an aqueous ice slurry from the ice slurry receiver-crystallizer to the feed tank;
    conduit means for withdrawing aqueous liquid from the feed tank and delivering it to the ice slurry receiver-crystallizer;
    conduit means for removing reject liquid and precipitate from the feed tank;
    a freeze exchanger for producing aqueous ice slurry, the freeze exchanger having an aqueous ice slurry inlet and an aqueous ice slurry outlet;
    conduit means for withdrawing aqueous ice slurry from the ice slurry receiver-crystallizer and delivering it to the freeze exchanger inlet;
    means for feeding aqueous ice slurry from the freeze exchanger outlet to the ice slurry receiver-crystallizer; and
    conduit means for removing ice slurry from the ice slurry receiver-crystallizer for delivering it to a separator for separating the slurry ice content from the liquid content.

11. Apparatus according to claim 10 in which:
    the ice slurry receiver-crystallizer includes conduit means for delivering the liquid content of an ice slurry thereto after the ice content is separated.

12. Apparatus according to claim 11 in which:
    a control valve is positioned in the conduit means for removing low specific gravity fluid from the feed tank.

13. Apparatus according to claim 10 in which:
    conduit means communicates with the feed tank for removing low specific gravity fluid therefrom.

14. Apparatus according to claim 10 in which:
    a control valve is positioned in the feed stream conduit for feeding a warm stream of contaminated aqueous liquid to the heat exchanger.

15. Apparatus according to claim 10 in which:
    a control valve is positioned in the conduit means leading from the heat exchanger to the feed tank.

16. Apparatus according to claims 14 or 15 in which:
    the valve is responsive to the temperature of the ice slurry in the receiver-crystallizer.

17. Apparatus according to claim 10 in which:
    a control valve is positioned in the conduit means for feeding an aqueous ice slurry from the ice slurry receiver-crystallizer to the feed tank.

18. Apparatus according to claim 17 in which:
    the control valve is responsive to the temperature of the liquid in the feed tank.

19. A method comprising:
    cooling a warm feed stream of aqueous liquid to close to but above the freezing point of the aqueous liquid and delivering it to a mixing tank;
    withdrawing an aqueous ice slurry from an ice slurry receiver-crystallizer and delivering it to the mixing tank to further cool the contents and produce temperature control of the mixing tank contents;
    withdrawing an aqueous slurry from the mixing tank and delivering it to a slurry thickener tank for precipitate separation thereof;

removing the precipitate from the slurry thickener tank and disposing of it;

withdrawing aqueous liquid from the thickener tank and delivering it to the ice slurry receiver-crystallizer; and withdrawing an aqueous ice slurry from the ice slurry receiver-crystallizer, feeding it through a freeze exchanger to produce additional aqueous ice slurry and withdrawing the aqueous ice slurry from the freeze exchanger and feeding it to the ice slurry receiver-crystallizer.

20. A method according to claim 19 including withdrawing low specific gravity fluids from the slurry thickener tank.

21. A method according to claim 19 in which ice slurry is removed from the ice slurry receiver-crystallizer and the ice content is separated from the liquid content.

22. A method according to claim 21 in which the separated liquid content is returned to the ice slurry receiver-crystallizer.

23. A method according to claim 19 in which the amount of ice slurry fed to the mixing tank is controlled by the temperature of the contents in the mixing tank.

24. A method according to claim 19 in which the amount of warm feed stream which is cooled and fed to the mixing tank is controlled by the temperature of the ice slurry in the receiver-crystallizer.

25. A method according to claim 19 in which the feed stream contains sodium sulfate and a member of the group consisting of sodium chloride and sodium thiosulfate.

26. A method comprising:

cooling a warm feed stream of aqueous liquid close to but above the freezing point of the aqueous liquid and delivering it to a feed tank;

withdrawing an aqueous ice slurry from an ice slurry receiver-crystallizer and delivering it to the feed tank to further cool the contents and produce temperature control of the mixing tank contents;

removing a precipitate from the feed tank and disposing of it;

withdrawing aqueous liquid from the feed tank and delivering it to the ice slurry receiver-crystallizer; and withdrawing an aqueous ice slurry from the ice slurry receiver-crystallizer, feeding it through a freeze exchanger to produce additional aqueous ice slurry and withdrawing the aqueous ice slurry from the freeze exchanger and feeding it to the ice slurry receiver-crystallizer.

27. A method according to claim 26 including withdrawing low specific gravity fluids from the feed tank.

28. A method according to claim 26 in which ice slurry is removed from the ice slurry receiver-crystallizer and the ice content is separated from the liquid content.

29. A method according to claim 28 in which the separated liquid content is returned to the ice slurry receiver-crystallizer.

30. A method according to claim 26 in which the amount of ice slurry feed to the feed tank is controlled by the temperature of the contents in the feed tank.

31. A method according to claim 26 in which the amount of warm feed stream which is cooled and fed to the feed tank is controlled by the temperature of the ice slurry in the receiver-crystallizer.

* * * * *

UNITED STATES PATENT AND TRADEMARK OFFICE
CERTIFICATE OF CORRECTION

PATENT NO. : 4,936,114

DATED : June 26, 1990

INVENTOR(S) : GERALD E. ENGDAHL ET AL

It is certified that error appears in the above-identified patent and that said Letters Patent is hereby corrected as shown below:

Column 2, line 49, change "control" to -- cool --; column 3, line 1, change "product" to -- produce --; column 4, line 43, change "system" to -- systems --; column 8, line 29, change "feed" to -- fed --.

Signed and Sealed this

Seventeenth Day of September, 1991

Attest:

HARRY F. MANBECK, JR.

*Attesting Officer*  *Commissioner of Patents and Trademarks*